Patented Jan. 5, 1943

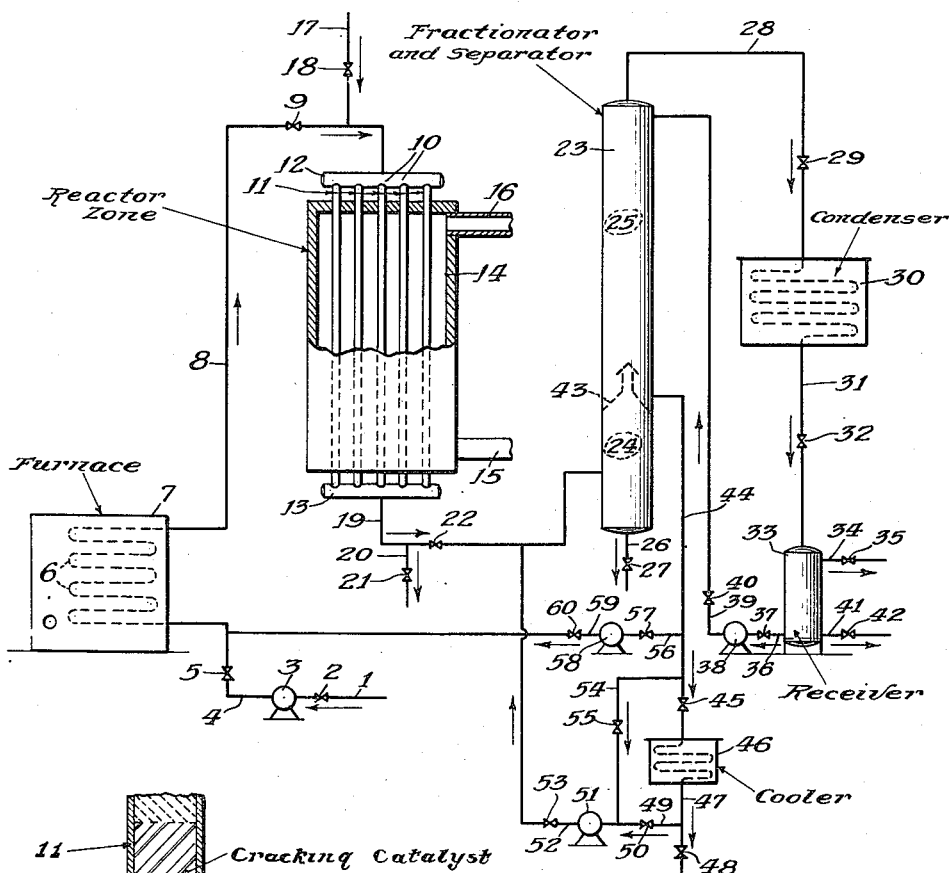

2,307,610

UNITED STATES PATENT OFFICE 2,307,610

CATALYTIC TREATMENT OF HYDRO-CARBONS

Charles L. Thomas, Chicago, Ill., assignor to Universal Oil Products Company, Chicago, Ill., a corporation of Delaware Application January 11, 1939, Serial No. 250,328

4 Claims. (Cl. 196—52)

This invention relates particularly to the catalytic treatment of hydrocarbon oils and is more specifically concerned with a process for converting hydrocarbon oils into optimum yields of high antiknock gasoline and relatively higher yields of gases relatively rich in olefins.

The invention provides for the simultaneous dehydrogenation and catalytic cracking of a hydrocarbon oil by subjecting said hydrocarbon oil, in the vapor state, to contact with suitable dehydrogenating and cracking catalysts placed in juxtaposition in the same reactor. There are possibly two general methods which may be employed with respect to positioning of the catalysts to accomplish the desired results, each of which will be described more fully below. However, it is not intended that the description which follows should limit the application of this invention except with respect to the main object of the invention which is to place a dehydrogenating catalyst in juxtaposition with a cracking catalyst so as to obtain the benefits of cracking an olefinic charging stock simultaneous with the production thereof.

The first and preferred method consists of physically admixing the separately prepared catalysts in either a finely divided state or as relatively coarse granules or pellets.

The second method for accomplishing the same object may consist of subjecting the hydrocarbon vapors to contact with alternate beds of the two catalysts disposed within the same reactor, such as, for example, subjecting them first to contact with a bed of dehydrogenating catalysts followed by contacting the same with a bed of cracking catalysts, etc.

The advantages of this process, aside from those which are characteristic of the individual reactions when they are conducted independently of each other in separate reactors, are as follows:

First, it has been found that the catalytic dehydrogenation reaction takes place before the cracking reaction with the result that the cracking stock will contain a substantial portion of olefinic hydrocarbons. Second, the olefinic hydrocarbons produced in the dehydrogenation reaction have been found to respond more readily to catalytic cracking and yield under a definite set of conditions a greater conversion per pass with less carbon formation. Still another advantage from an economical standpoint lies in the fact that both reactions may be carried out simultaneously in a single reactor and hence the amount of equipment necessary for obtaining the desired results is less than would otherwise be required.

Within the broad concepts of this invention, dehydrogenation refers to the breaking of carbon-to-hydrogen bonds resulting in the splitting off of hydrogen from the molecule and the formation of a molecule containing a double bond, such as, for example, a paraffin to an olefin hydrocarbon, whereas catalytic cracking refers to the breaking of the carbon-to-carbon bond resulting in the formation of two or more molecules of lighter hydrocarbons than the original.

In one specific embodiment the present invention comprises vaporizing hydrocarbon oil, subjecting the vapors to contact with suitable dehydrogenating and cracking catalysts placed in juxtaposition in the same reactor, separating the resultant conversion products, and separately recovering gas, gasoline, and heavier hydrocarbons from said conversion products as products of the process.

The outline of the process given in the preceding paragraph will be amplified in the following description to indicate its important features in greater detail by describing characteristic operations in connection with the attached diagrammatic drawing. Figure 1 of the accompanying drawing illustrates diagrammatically in side elevation one specific form of the apparatus in which the process of the invention may be conducted. Figure 2 illustrates diagrammatically the arrangement of the catalyst beds with the reactor.

Referring to Figure 2 of the drawing, charging stock for the process, preferably comprising a hydrocarbon oil heavier than gasoline, is introduced through line 1 containing valve 2 to pump 3 which discharges through line 4 containing valve 5 into heating coil 6. The oil subjected to heating in coil 6 is substantially completely vaporized therein and raised to the desired temperature by means of heat supplied from a suitable furnace 7. In order to suppress the pyrolytic cracking reaction when vaporizing the charging stock, it is preferred that relatively short heating times be employed in heating coil 6 and relatively high heat input rates. The vaporized charging stock is discharged from heating coil 6 at a relatively low superatmospheric pressure and is directed through line 8 containing valve 9 to catalytic reactor 10.

In the case here illustrated, catalytic reactor 10 comprises a plurality of relatively small diameter reactor tubes 11 connected in parallel between upper and lower headers 12 and 13 and is disposed within a heating or cooling zone 14. Since catalytic cracking and dehydrogenation are both endothermic reactions (requiring heat), in order to obtain best results some form of heating must be employed in zone 14. It has been found that best results are usually obtained when employing fluid heating means, preferably comprising hot combustion gases, which may be introduced to zone 14 through duct 15, passed in indirect heat exchange relationship with the vapors passing through reactor tubes 11, after which they are discharged from the upper portion of zone 14 through duct 16.

In catalytic reactions such as are involved in this invention, the deposition of carbon on the catalysts is relatively rapid and tends to decrease their activity. In order to obtain best results, relatively short periods of operations are employed, i. e., the catalysts are subjected to contact with process vapors for a relatively short time and are then reactivated in approximately the same length of time. In this case it is preferred that a plurality of reactors be employed each disposed within a separate heating or cooling zone, and in order to make the operation continuous the reactivation may be accomplished in some of the reactors while the others are processing.

Although I have found it advantageous to employ a reactor of the type described above, various other kinds of reactors may be employed, such as, for example, the chamber type, without departing from the broad scope of the invention.

The hydrocarbon vapors introduced to header 12 of reactor 10 are directed through reactor tubes 11 and are subjected to contact therein with suitable dehydrogenating and cracking catalysts placed in juxtaposition under selected conditions of temperature and pressure.

Catalysts are preferably employed which have been found to be highly efficient respectively in the catalytic dehydrogenation and catalytic cracking of hydrocarbon oil vapors to produce optimum yields of gasoline and relatively higher yields of gaseous hydrocarbons relatively rich in olefins. Highly effective dehydrogenating catalysts are those consisting of activated aluminum oxide supporting about 20% or less of chromium sesquioxide. Such catalysts are preferably produced by the deposition of chromium trioxide or its salts or compounds of trivalent chromium such as chromium nitrate, $Cr(NO_3)_3$, or chromium trihydroxide $Cr(OH)_3$, upon the activated alumina granules. The process, however, is not limited to this particular composition of dehydrogenating catalysts but may employ other composite catalysts of a refractory character, such as, for example, alumina or silica or other inert refractory material supporting various compounds and preferably oxides, such as, for example, those selected from the group comprising compounds and oxides of the elements in the left hand column of groups 4, 5, and 6 in the periodic table.

Catalysts for effecting catalytic cracking consist in general of pellets or granules of specially prepared silica-alumina masses, the amount of alumina being varied to suit requirements depending upon the stock to be treated and the operating conditions employed. As a rough average, good results are usually obtained, for example, when the mass contains the equivalent of 15% alumina. This percentage is varied for best results under specific conditions over a relatively wide range, for example, from 2% to 50%, or alumina may be employed as the major portion and the silica as the minor portion of the catalyst, the amount of silica composited with the alumina being varied over substantially the same range, i. e., 2% to 50%. Catalysts of this character may be initially prepared in any of several different manners and subsequently dried. The preferred catalyst is prepared by precipitating silica from a solution of sodium silicate by acidifying with an acid, such as hydrochloric acid, for example, subsequently treating and washing the silica to remove substantially all of the alkali metal ions, suspending the purified silica gel in a solution of aluminum salts and depositing the alumina gel upon the suspended silica by the addition of volatile basic precipitants, such as, for example, ammonium hydroxide, ammonium carbonate or ammonium sulfide. After the alumina gel has been deposited upon the purified hydrated silica gel the material is dried, formed into pellets, when desired, and calcined at a temperature of from approximately 850 to 1000° F. The process, however, is not limited to this particular composition of cracking catalysts but many other composite catalysts of a refractory character, such as, for example, silica supporting compounds of the group comprising zirconia, vanadia, alumino-zirconia, and alumina-thoria, and acid treated clays may also be employed.

The catalysts which are alternately utilizable are not exactly equivalent in their reaction and are not to be considered as absolute substitutes one for the other. This fact will be more or less apparent to those conversant with the practical aspects of catalysis.

In the particular case here illustrated, when the catalysts are reactivated the flow of hydrocarbon vapors is stopped and suitable reactivating gas mixtures at an elevated temperature and containing regulated quantities of oxygen are introduced to catalytic reactor 10 through line 17 containing valve 18 and line 8. Reactivating gases pass through reactor tubes 11 and due to oxidation, the carbon deposited upon the catalysts disposed therein is caused to burn. The resulting mixture of combustion gases and reactivating gases is discharged from reactor 10 through line 19 and line 20 containing valve 21 to storage for further use as the reactivating gas mixture or a portion or all may be cooled and recirculated as the reactivating gas mixture or the whole may be discharged to the atmosphere, as desired. When reactivating an exothermic reaction takes place and, therefore, suitable means must be employed to dissipate this heat of reaction. In this case it is preferred to employ cooled combustion gases which are supplied to zone 14 through duct 15, are passed in indirect heat exchange relationship with the flow of reactivating gases in the reactor tubes 11, and are discharged therefrom through duct 16.

The hot conversion products are discharged from header 13 of reactor 10 through line 19 and are directed through valve 22, cooled to the desired temperature by commingling a suitable cooling oil introduced as hereinafter described with said hot conversion products, and the resulting mixture, comprising conversion products and cooling oil, is introduced to a separating zone 24 wherein the residual liquids are separated from the vaporous components. As illustrated in the accompanying diagrammatic drawing, separating zone 24 may form the lower portion of fractionator and separator 23 and is separated from the fractionating zone 25 by means of a reflux trapout tray 43. However, other means, such as, for example, separate vessels, may be employed to accomplish the same purpose, this fact being well known to those skilled in the art.

The residual liquids are discharged from the lower portion of separating zone 24 through line 26 and are directed through valve 27 to cooling and storage or elsewhere as desired. The vaporous components are introduced to fractionating zone 25 wherein fractionated vapors in the gasoline boiling range are separated from higher boiling hydrocarbons. Fractionated vapors of the desired end boiling point are withdrawn from the upper portion of fractionating zone 25 through line 28 and are directed through valve 29 to cooler and condenser 30. The resulting gas-containing distillate, together with undissolved and uncondensed gases discharged from condenser 30, are directed through line 31 and valve 32 to receiver 33.

Undissolved and uncondensed gases collected and separated in receiver 33 are discharged from the upper portion thereof through line 34 and are directed through valve 35 to collection and storage or elsewhere as desired. Regulated portions of the distillate collected in receiver 33 are directed through line 36 containing valve 37 to pump 38 from which it is discharged through line 39 containing valve 40 into the upper portion of fractionating zone 25 for refluxing and cooling therein. The remaining distillate collected in receiver 33 is withdrawn from the lower portion thereof through line 41 and is directed through valve 42 to stabilization and subsequent storage or elsewhere as desired.

The heavier hydrocarbons separated from the fractionated vapors, comprising a fraction whose average boiling point is above that of said fractionated vapors, are condensed as reflux condensate in fractionating zone 25. The reflux condensate collected in trapout tray 43 in the lower portion of fractionating zone 25 is discharged therefrom through line 44, and preferably directed through valve 45 to cooler 46 from which it is discharged through line 47 and is directed all or in part through valve 48 to storage or elsewhere as desired. Preferably, however, a regulated portion of the cooled reflux condensate in line 47 is directed through line 49 containing valve 50 to pump 51 from which it is discharged through line 52 containing valve 53 and commingled as cooling oil with the hot conversion products in line 19, as previously described. It may be desirable at times to utilize all or a portion of the cooling oil at substantially the same temperature or at a temperature somewhat below that at which the reflux condensate is withdrawn from the fractionating zone, in which case all or a portion of the cooling oil so utilized may be by-passed around cooler 46 by closing off on valve 45 and directing the desired quantities of reflux condensate through line 54 containing valve 55 to line 49 where it commingles with cooled portions of reflux condensate directed through valve 50.

In order to obtain greater yields of gasoline than would be obtained in a single pass operation, a portion or all of the reflux condensate in line 44 not employed as cooling oil for the hot conversion products may be directed through line 56 containing valve 57 to pump 58 from which it is discharged through line 59 containing valve 60 into line 4 wherein it is commingled with the charging stock prior to its being heated and vaporized in heating coil 6.

Referring now to Fig. 2 of the drawing, catalyst tube 11, which is representative of the tubes 11 shown in Figure 1, contains alternate beds of cracking and dehydrogenating catalysts. These beds may be of varying depth depending upon the operating conditions which are employed in the reaction zone and upon the respective activities of the catalysts.

The preferred range of operating conditions which may be employed in an apparatus such as illustrated and above described to accomplish the desired results is approximately as follows:

The heater to which the charging stock is supplied may employ an outlet temperature ranging, for example, from 800 to 1200° F. and a superatmospheric pressure of from 20 to 100 pounds or more per square inch. Substantially the same conditions of temperature and pressure are maintained on the process vapors introduced to the catalystic reactor as are employed on the outlet of the heating coil. The conversion products discharged from the catalytic reactor are preferably cooled to a temperature ranging, for example, from 600 to 800° F. or at least to a sufficiently low temperature to substantially arrest any thermal cracking reaction. The combined fractionator and separator may utilize a pressure substantially the same as that employed at the outlet of the catalytic reactor.

As an example of one specific operation of the process as it may be accomplished in an apparatus such as illustrated and above described, the charging stock, comprising a 36.7° A. P. I. gravity Mid-Continent gas-oil, was subjected to contact with a mechanical mixture of an alumina-chromia dehydrogenating catalyst and a silica-alumina cracking catalyst disposed within the same reactor at a temperature of approximately 900° F. and under a superatmospheric pressure of 40 pounds per square inch. The conversion products discharged from the catalytic reactor were cooled to approximately 650° F. with reflux condensate produced as subsequently described. The conversion products, together with the cooling oil were introduced to a separating zone wherein the residual liquids were separated from the vaporous components and the former withdrawn as a product of the process. The vaporous components were fractionated in a fractionating zone to separate a gasoline boiling range fraction from the heavier hydrocarbons whose average boiling point was above that of the gasoline product. The gasoline boiling range fraction was withdrawn from the upper portion of the fractionating zone, condenser, and recovered as a product of the process. The heavier hydrocarbons were condensed as reflux condensate in the fractionating zone and were withdrawn from the lower portion thereof, a portion returned as cooling oil to the conversion products, as previously described, and the balance recovered as a product of the process. This operation yielded approximately 44% of 81 octane number gasoline by volume of the charge and a gas production of approximately 350 cubic feet per barrel of charge.

I claim as my invention:

1. A process for the conversion of hydrocarbon oils which comprises introducing paraffinic hydrocarbons heavier than gasoline to a reactor containing separate and distinct bodies of two different catalysts arranged in alternate beds, the predominating action of one of said catalysts upon the hydrocarbons being to convert paraffins to olefins by the breaking of carbon-to-hydrogen bonds and the predominating action of the other of said catalysts being the breaking of carbon-to-carbon bonds with resultant decomposition of a hydrocarbon molecule into lighter hydrocarbons, and simultaneously effecting in said reactor a dehydrogenation of paraffins to olefins heavier than gasoline and a cracking of the latter into lower boiling hydrocarbons.

2. A process for the conversion of hydrocarbon oils heavier than gasoline which comprises vaporizing the oil and introducing the vapors to a reactor containing separate and distinct bodies of two different catalysts arranged in alternate beds, the predominating action of one of said catalysts upon the vapors being to convert paraffins to olefines by the breaking of carbon-to-hydrogen bonds and the predominating action of the other of said catalysts being the breaking of carbon-to-carbon bonds with resultant decomposition of a hydrocarbon molecule into lighter hydrocarbons, maintaining said reactor at a temperature of about 800 to 1200° F. and under a pressure of from substantially atmospheric to about 100 pounds per square inch, and simultaneously effecting in said reactor a dehydrogenation of paraffins contained in the vapors to olefins heavier than gasoline and a cracking of the latter into lower boiling hydrocarbons.

3. A hydrocarbon oil conversion process which comprises passing paraffinic hydrocarbons heavier than gasoline through a reactor containing an alumina-chromia catalyst and a silica-alumina catalyst arranged in alternate beds, and simultaneously effecting in said reactor a dehydrogenation of paraffins to olefins heavier than gasoline and a cracking of the latter into lower boiling hydrocarbons.

4. A hydrocarbon oil conversion process which comprises vaporizing paraffinic oil heavier than gasoline and passing the vapors through a reactor containing an alumina-chromia catalyst and a silica-alumina catalyst arranged in alternate beds, maintaining the reactor at a temperature of about 800 to 1200° F. and under a pressure of from substantially atmospheric to about 100 pounds per square inch, and simultaneously effecting in said reactor a dehydrogenation of paraffins contained in the vapors to olefins heavier than gasoline and a cracking of the latter into lower boiling hydrocarbons.

CHARLES L. THOMAS.